(No Model.) 10 Sheets—Sheet 1.

W. KOCH.
CASH REGISTER.

No. 505,553. Patented Sept. 26, 1893.

WITNESSES:
N. Marler
Chas. Hanimann

INVENTOR
William Koch
BY
Geo. H. Graham
ATTORNEY (No Model.) 10 Sheets—Sheet 2.
W. KOCH.
CASH REGISTER.
No. 505,553. Patented Sept. 26, 1893.
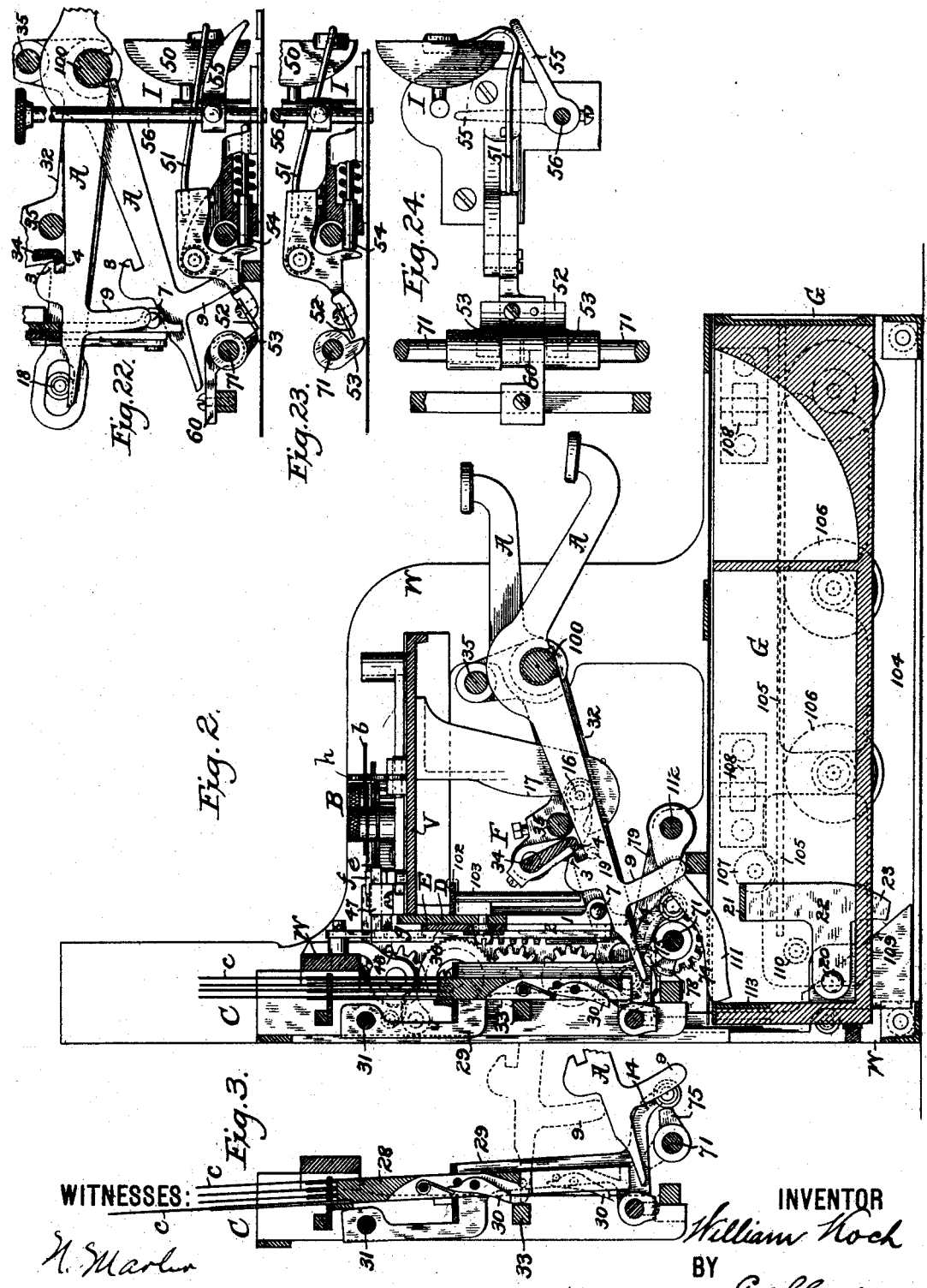
WITNESSES:
H. Marlow
Chas Hanimann
INVENTOR
William Koch
BY
G. H. Graham
ATTORNEY (No Model.)
10 Sheets—Sheet 3.
W. KOCH.
CASH REGISTER.
No. 505,553.   Patented Sept. 26, 1893.
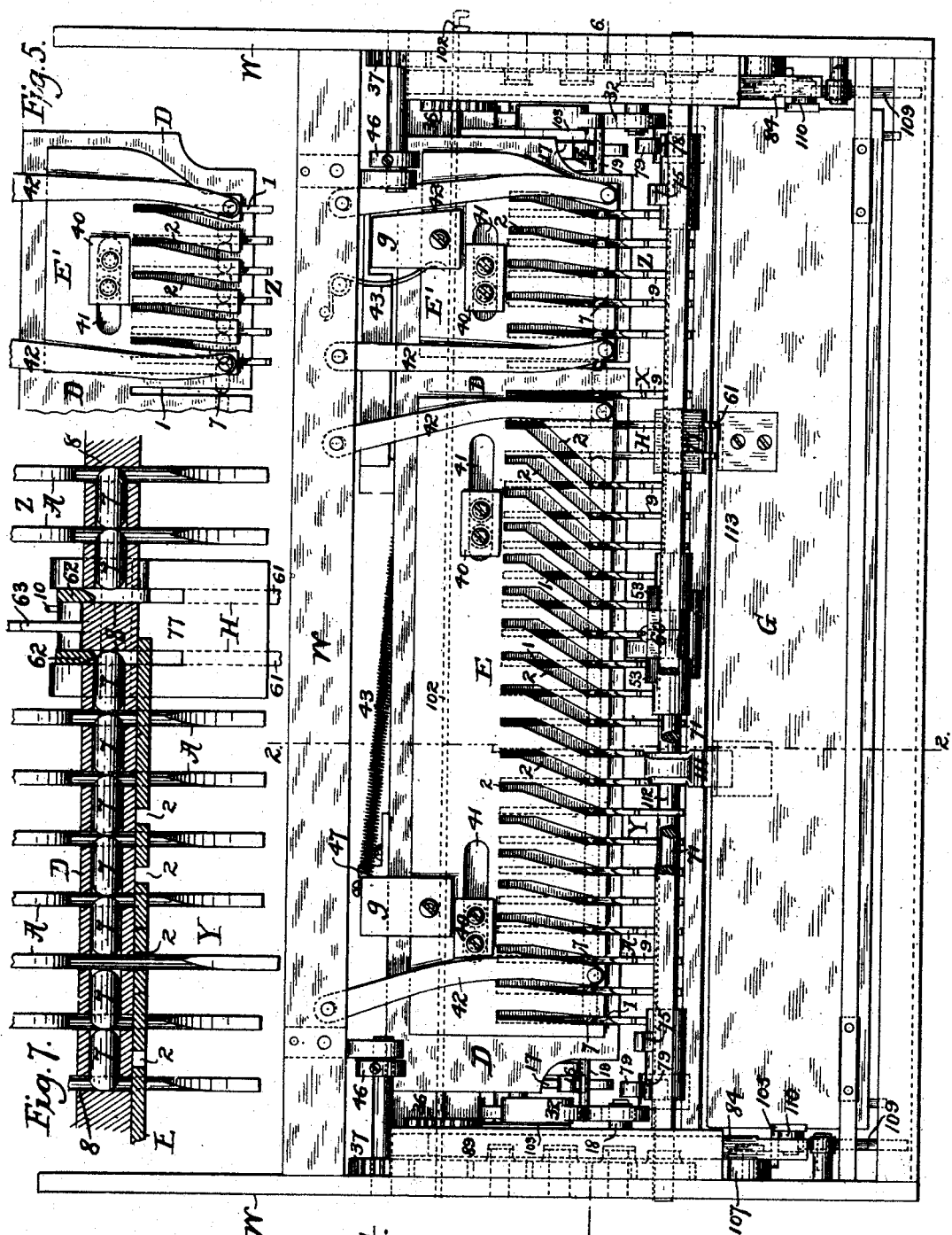
WITNESSES:
N. Marler
Chas Hanimann
INVENTOR
William Koch
BY
G. H. Graham
ATTORNEY

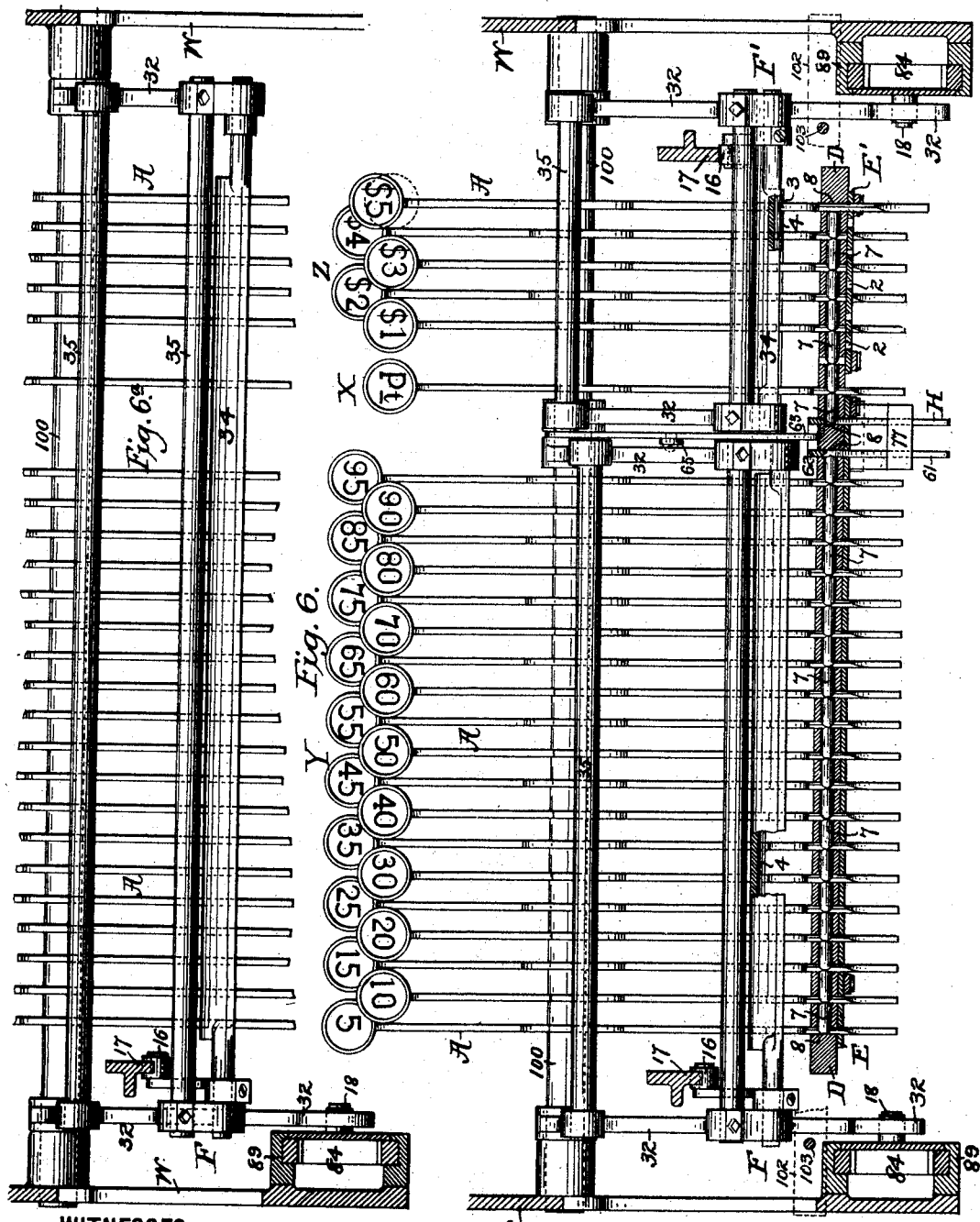

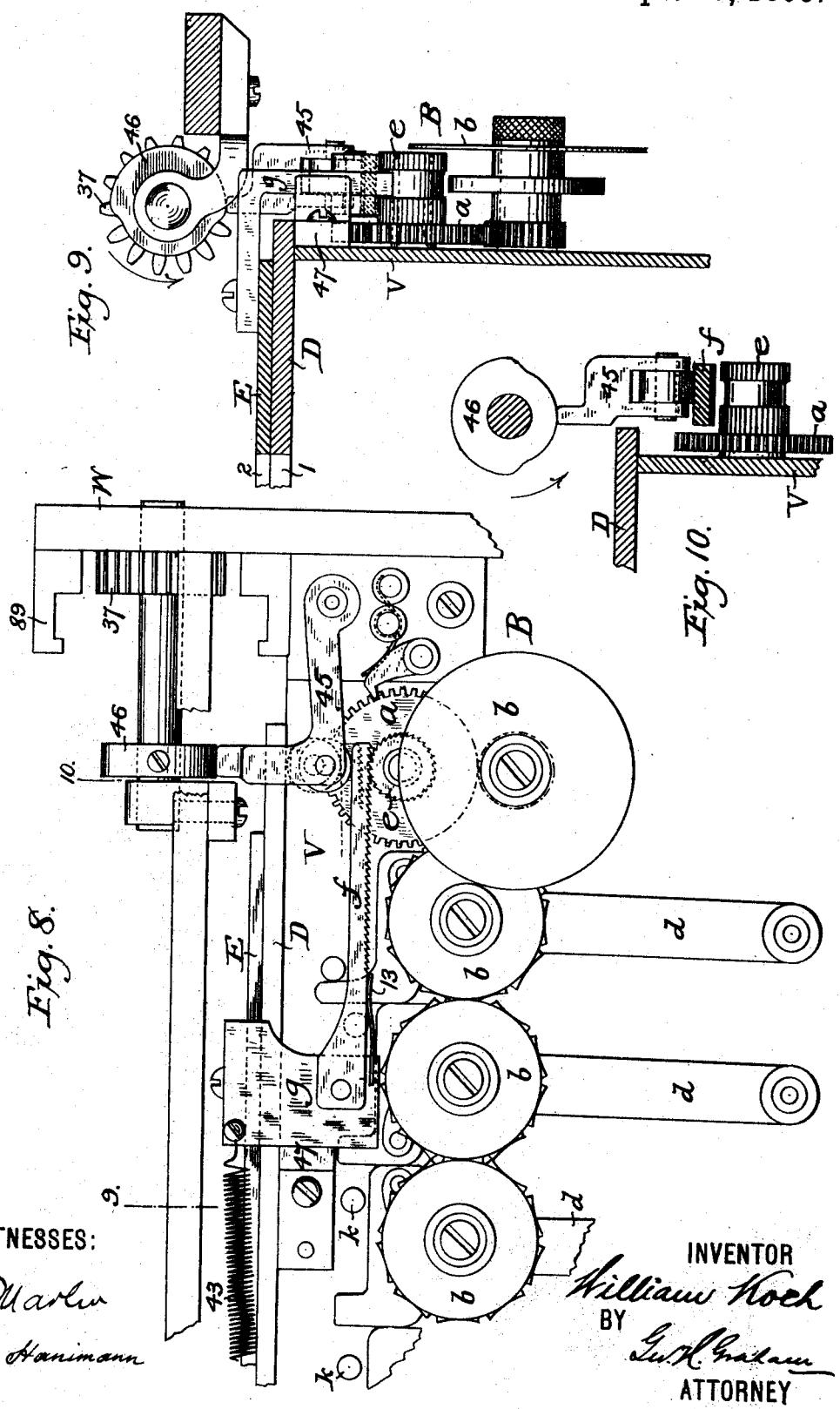

(No Model.)
W. KOCH.
CASH REGISTER.
No. 505,553.
Patented Sept. 26, 1893.
10 Sheets—Sheet 6.
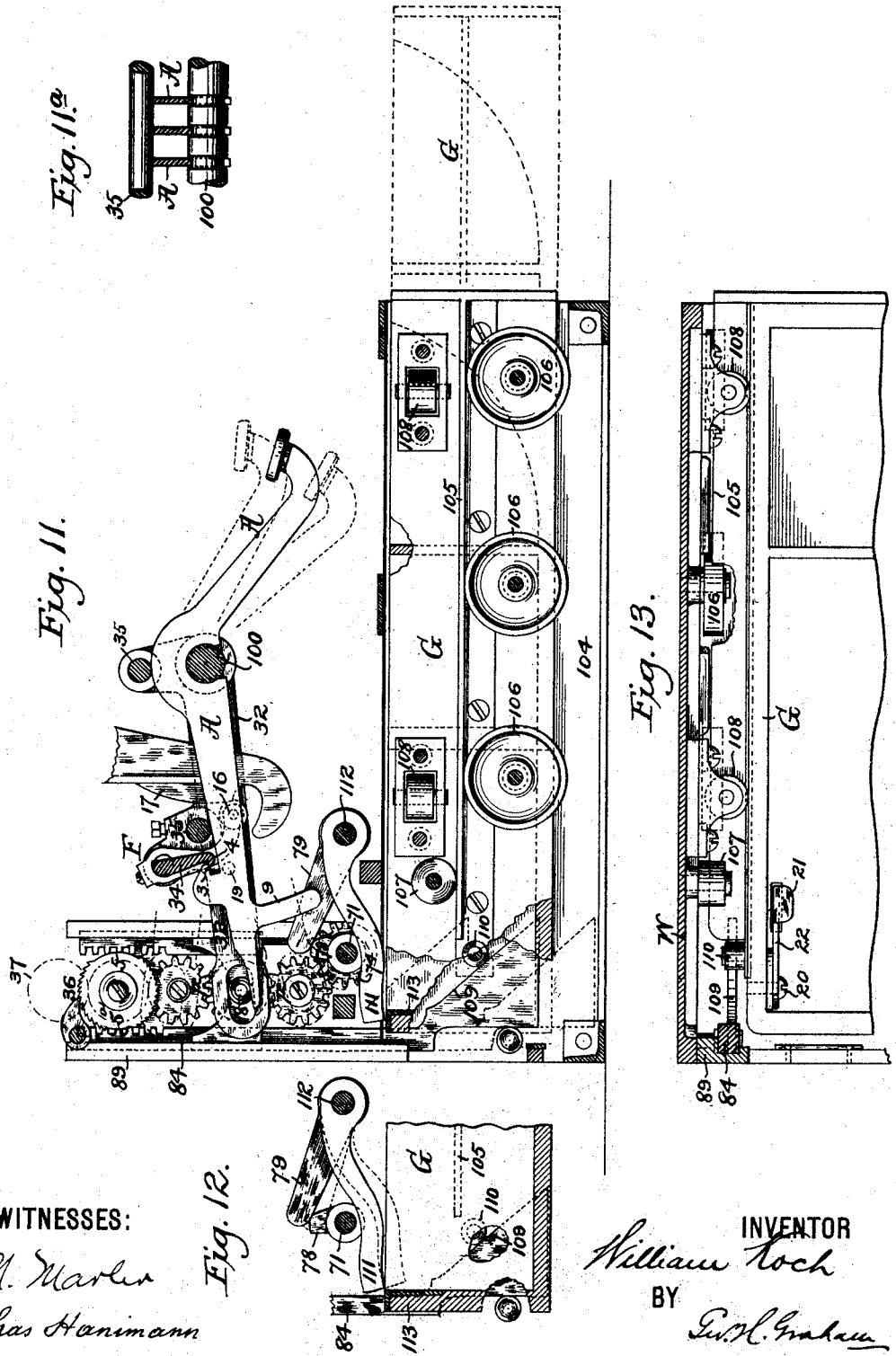
WITNESSES:
N. Marler
Chas Hanimann
INVENTOR
William Koch
BY
Geo. H. Graham
ATTORNEY

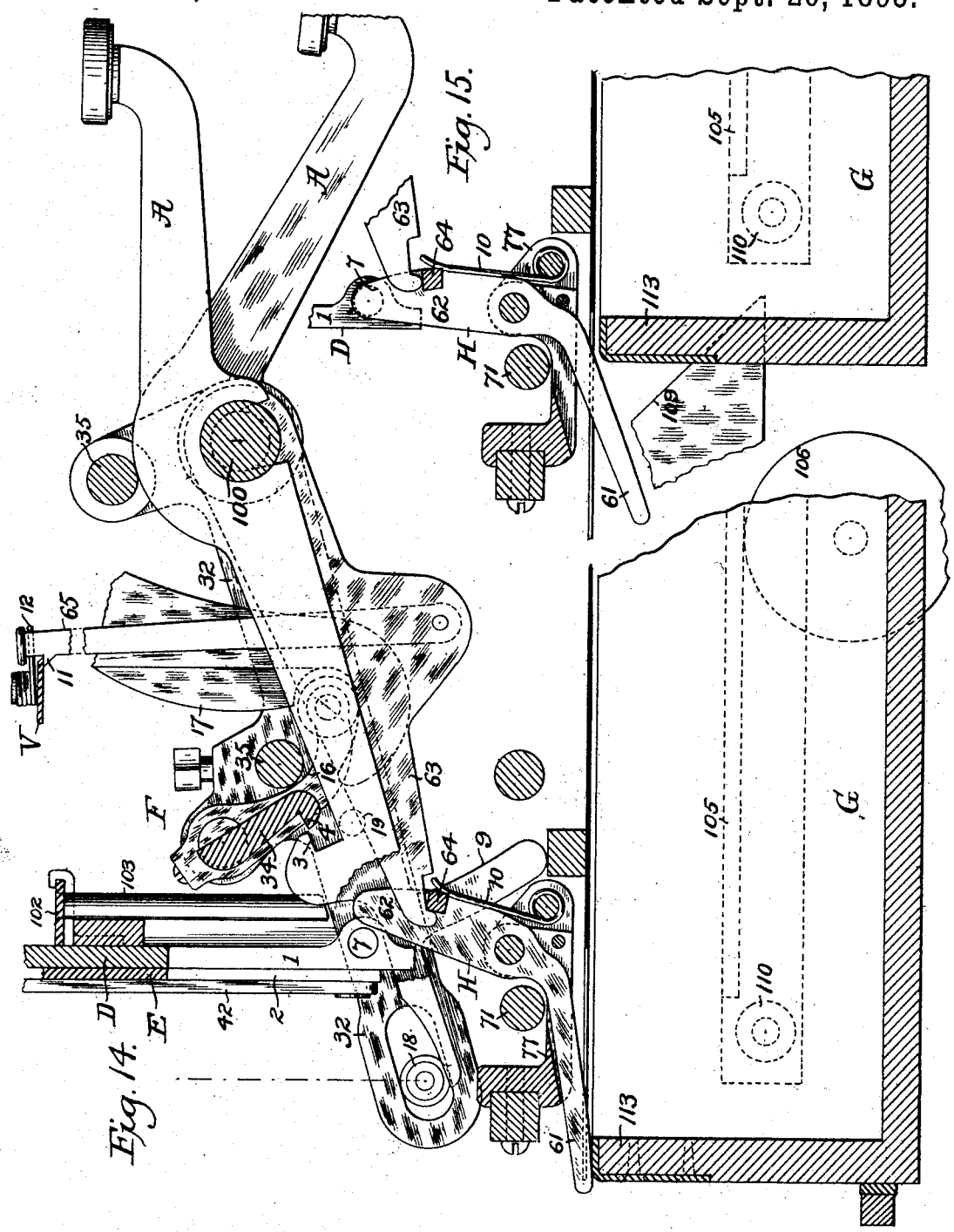

(No Model.) W. KOCH. 10 Sheets—Sheet 8.
CASH REGISTER.
No. 505,553. Patented Sept. 26, 1893.
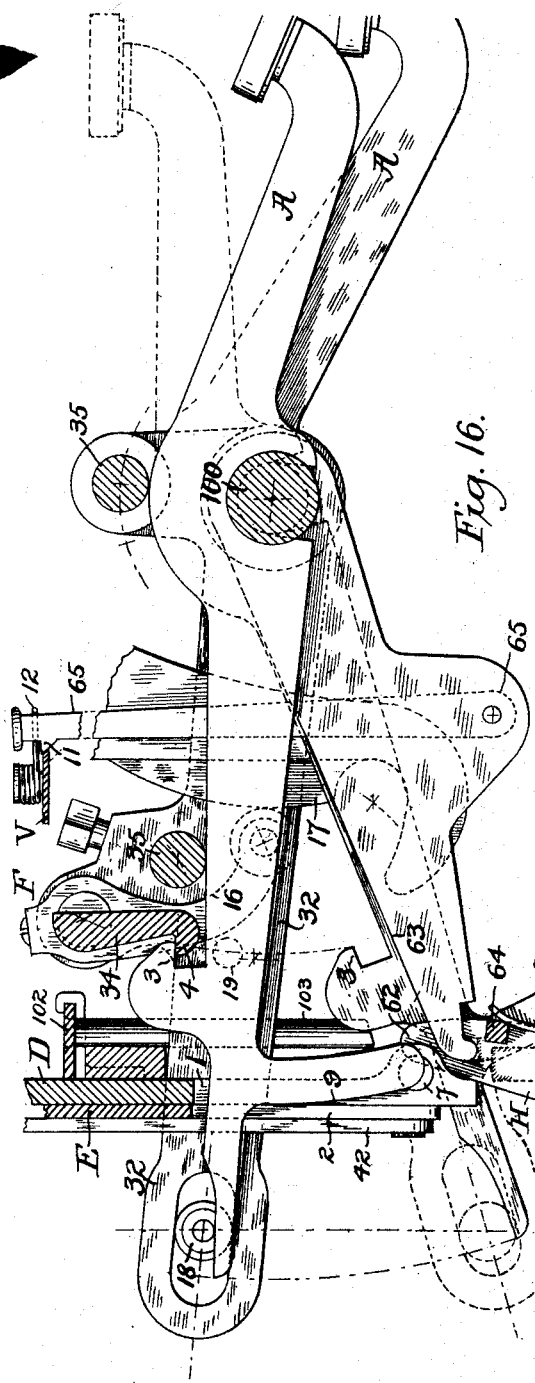
Fig. 16.
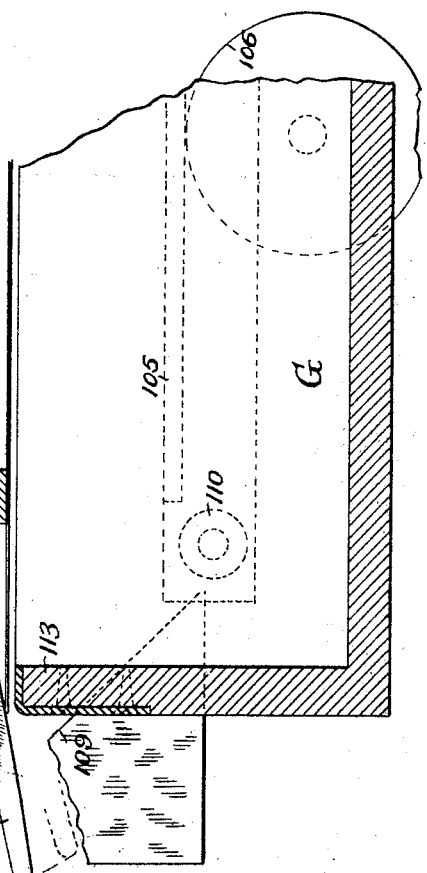
WITNESSES:
INVENTOR
William Koch
BY
ATTORNEY (No Model.)   10 Sheets—Sheet 9.
W. KOCH.
CASH REGISTER.
No. 505,553.   Patented Sept. 26, 1893.
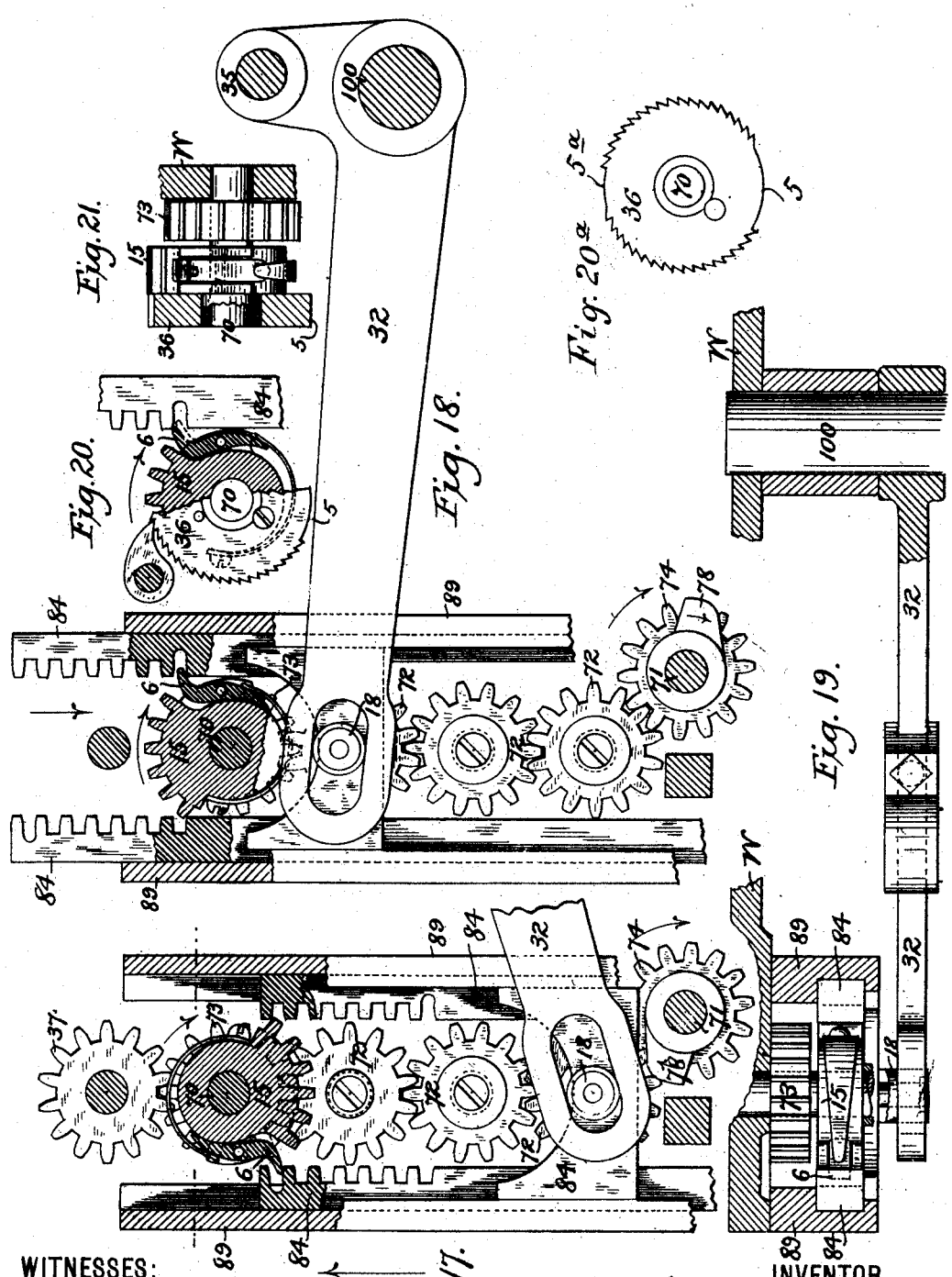
WITNESSES:
N. Marler
Chas. Hanimann
INVENTOR
William Koch
BY
G. H. Graham
ATTORNEY (No Model.)  
10 Sheets—Sheet 10.

W. KOCH.
CASH REGISTER.

No. 505,553. Patented Sept. 26, 1893.

Witnesses  
Chas Hansmann  
N. Marler

Inventor  
William Koch  
By his Attorney  
Geo. H. Graham

UNITED STATES PATENT OFFICE.

WILLIAM KOCH, OF NEW YORK, N. Y., ASSIGNOR, BY MESNE ASSIGNMENTS, TO THE NATIONAL CASH REGISTER COMPANY, OF DAYTON, OHIO.

CASH-REGISTER.

SPECIFICATION forming part of Letters Patent No. 505,553, dated September 26, 1893.

Application filed July 15, 1891. Serial No. 399,640. (No model.)

*To all whom it may concern:*

Be it known that I, WILLIAM KOCH, a citizen of the United States, residing in the city, county, and State of New York, have invented certain new and useful Improvements in Cash-Registers, fully set forth in the following description and represented in the accompanying drawings.

This invention relates to that class of cash registers wherein a plurality of keys of different values are employed to effect the operation of a registering device by which the sums of the values of the keys operated are preserved, and to cause the display of an indicator or indication agreeing in value to the key operated.

The present invention has for its object to improve the construction and operation of cash registers whereby they are rendered more effective and less liable to become inoperative through rough handling or adroit manipulation for defrauding purposes.

To this end the improvements consist in novel structures and combinations of parts hereinafter set forth, reference being had to the accompanying drawings, in which—

Figure 1:
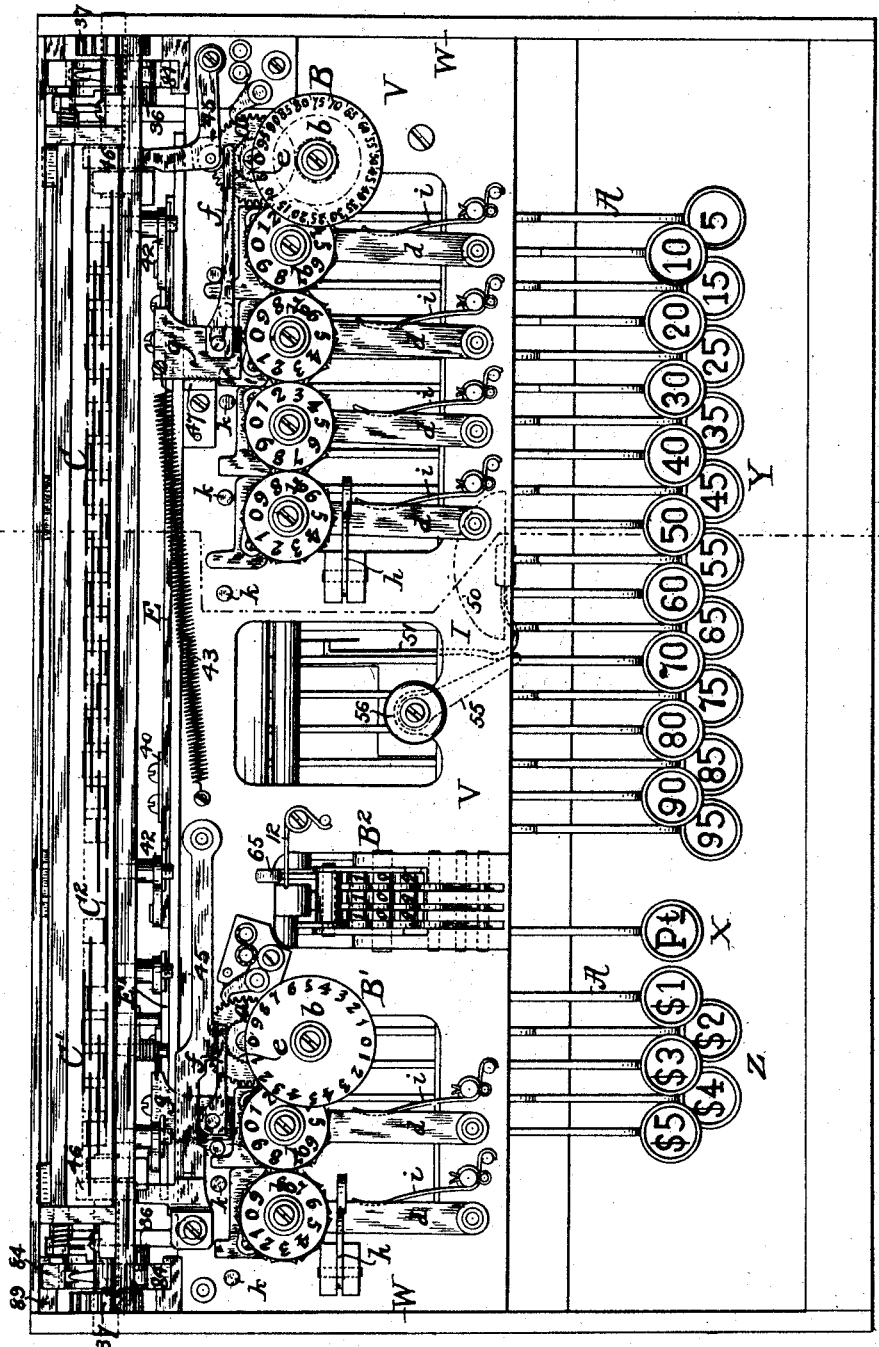
Figure 26:
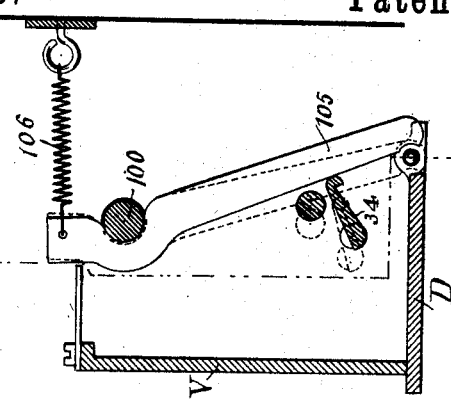
Figure 25:
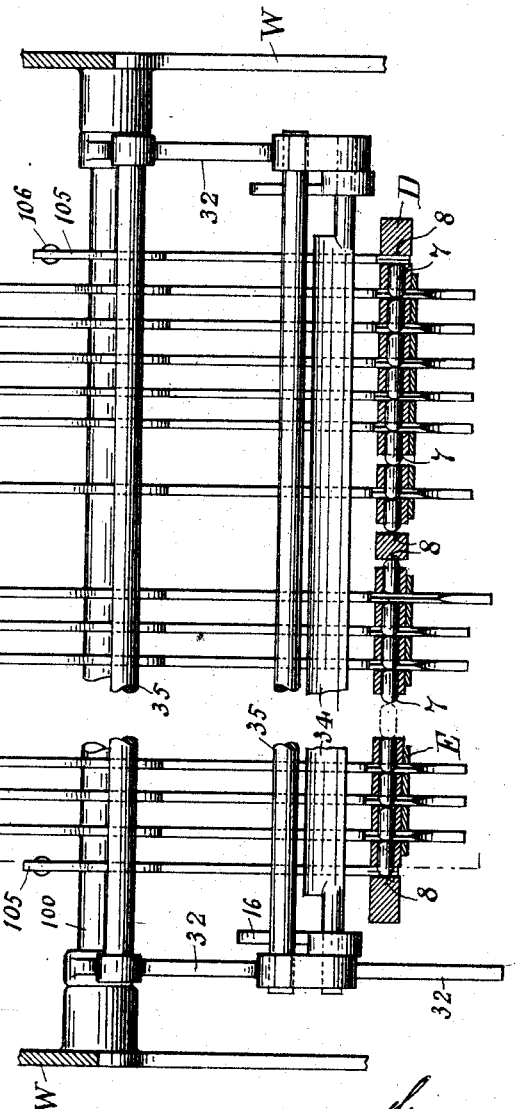

Figure 1 is a plan view of a complete machine embodying the present improvements, the inclosing case being omitted. Fig. 2, is a transverse sectional elevation taken on the line 2 of Figs. 1 and 4. Fig. 3, is a similar view of the indicating mechanism showing in detail the movement of an indicating tablet and its rocking frame. Fig. 4, is a rear elevation of the machine, the indicating mechanism being omitted. Fig. 5, is a similar view showing a portion only of the machine, and particularly the changed position of the differential plate for the dollars bank upon the movement of the five dollars key. Fig. 6, is a horizontal sectional view taken on the line 6, 6, of Fig. 4, the five dollars key being shown in its moved position; and Fig. 6ª is a slight modification of the key controller shown in Fig. 6. Fig. 7, is an enlarged horizontal section taken substantially on the same lines as Fig. 6, the fifteen cent key being shown in its changed position, and only a few keys being shown. Fig. 8, is an enlarged plan view of a portion of the devices shown in Fig. 1, showing particularly the registering mechanism. Fig. 9, is a transverse section of the same taken on the line 9 of Fig. 8. Fig. 10, is a similar view taken on the line 10 of Fig. 8. Fig. 11, is a view similar to Fig. 2, illustrating the operation of one of the keys and the movement of the cash drawer, which is shown in elevation partially broken away at its rear; and Fig. 11ª, is a sectional detail of the key-levers. Fig. 12, is a similar view to Fig. 11, illustrating in detail the movement of the latch for the cash drawer. Fig. 13, is a horizontal sectional elevation of a portion of the devices shown in Fig. 11, showing particularly the mounting of the cash drawer at one side. Figs. 14, 15 and 16, are enlarged transverse sectional elevations showing the details of the key locking devices and the key controlling and coupling devices, and illustrating their operation. Figs. 17 and 18, are enlarged detailed sectional elevations of the means for imparting rotary motion to the cam shaft hereinafter described. Fig. 19, is a plan partly in section of the devices shown in Figs. 17 and 18 in the position they occupy in Fig. 20. Fig. 20, is a sectional detail of the driven pinion and its ratchet of the devices shown in Figs. 17 and 18. Fig. 20ª, is a modification of the ratchet; and Fig. 21, is an elevation of the devices shown in Fig. 20. Figs. 22 and 23 (Sheet 2) are similar views showing in detail the alarm mechanism; and Fig. 24, is a detailed plan view of the same devices. Fig. 25, is a detailed plan of a modification of the devices shown in Figs. 6 and 6ª; and Fig. 26, is a sectional elevation taken on the line 26, 26, of Fig. 25.

Referring to said drawings it should be stated that the several improvements embraced by the present invention are embodied in a perfected machine adapted to the various exigencies to which a machine in practical use should be capable of meeting; and, although the various improvements are shown in a single organization, it should be stated that they may be employed in such machines either separately or together. This complete embodiment of the invention comprises a plurality of keys which may be arranged in two or more independent banks with an indicating and registering mechanism, whereby upon the operation of any key its value is indicated and registered, and the sum of the values of the keys operated at the same time preserved by the registering mechanism.

The machine includes, as an automatic connection between the keys and the registering mechanism, a differential plate capable of imparting a movement to the registering device corresponding to the value of the key operating the plate; and where two independent banks of keys are used each bank will be provided with a differential plate independent of the other, each to operate its own registering mechanism.

The machine furthermore includes a key controller whereby upon the commencement of the movement of a key it is compelled to move to the limit of its stroke in one direction before it can be returned to its normal position, and by which after it has reached the limit of its stroke in one direction it is compelled to return to its normal position before being moved again; the said key controller also embracing a key coupler by which two keys each in different banks may be coupled together so as to be operated simultaneously—both keys being at the same time under the control of the key controller. It furthermore includes a key locking device by which only one key may be operated at a time, or by which one key in a bank may be operated at a time, but permitting the simultaneous operation of two keys of different banks when two independent banks are used; and with the same key locking device, or with some other locking device, is combined a keeper under the control of a cash drawer with which the machine is provided, by which while the drawer or its lid is open the mechanism of the register is locked against movement and which upon being closed will release such mechanism and permit it to operate as before.

The machine further includes a rotary shaft, either common to all of the keys of the machine, or made in sections and one section common to one bank of the keys and the other section common to the other bank of keys, whereby upon its movement the drawer is unlocked, the previously exposed indicating tablet is released and permitted to return to its normal position, and the alarm is sounded. It also includes a means, after the drawer has been unlocked, of positively moving said drawer either partially or wholly to its open position, and which means upon the return of the key to its normal position forms no obstruction for the return of the drawer to its closed position.

Referring now to Figs. 1 to 6 inclusive, it will be understood that the improved register embraces a plurality of keys A of different values, a registering mechanism B adapted to be operated upon the movement of the keys to preserve the sums of their values, and an indicating mechanism C also adapted to be operated upon the movement of the keys to indicate the value of the keys operated. The register embracing these three instrumentalities is shown as divided into two distinct sets Y, Z, thereof, adapted to register and indicate, for instance, cents and dollars, and there is also shown a third distinct set X, thereof, adapted to register and indicate the sale or sales of a specific article. These sets are so arranged that the operation of any one of the keys in the cents bank Y will cause the operation of the register B and the indicator C; the operation of any key in the bank Z will cause the operation of the register B' and the exposing of an indicator C'; while the operation of the single key X will actuate its register $B^2$ and display its indicator $C^2$.

The keys A of each of the banks are in the form of levers oscillating upon a rod 100, common to them all, that extends between the side frames W of the machine. These keys are formed from sheet metal and each has a depressed seat to straddle a groove in the rod 100, the sides of which groove hold each key in proper position, see Fig. $11^a$. The outer ends of the keys are bent so that their ends will lie in different planes, and their inner ends extend rearwardly each in line with or partially entering a guide slot 1 in a fixed back plate D extending between the side frames; the guide slots 1 being of such length as to permit the full vibration of the keys and to guide and steady them during such vibration, which slots, with the grooved seats in the rod 100, serve to keep the keys in position and greatly facilitate their easy assembling in the machine.

The registering mechanism may be of any approved form, adapted to be actuated, for instance, by the movement of a master wheel, $a$, and this master wheel may obviously be mounted at any point in the machine found most convenient.

The registering mechanisms B and B' are of substantially the same construction and are operated in substantially the same manner, and hence a description of one will suffice for both; the registering mechanism $B^2$ for the key X being of any well known form and shown as consisting of a series of adding wheels operated directly from the key. With each mechanism B and B' the master wheel $a$, see Figs. 8 and 9, in a train of adding wheels $b$, &c., is mounted to rotate on a vertical spindle projecting from a horizontal top plate V, extending between the side frames of the machine. The master wheel is formed with an extended hub whose periphery is serrated to form a ratchet $e$, adapted to be engaged by the teeth of the ratchet-bar or pawl $f$, arranged to reciprocate horizontally or otherwise move over the top plate V in proximity to the ratchet $e$.

In order to cause the ratch-bar of the master wheel of each registering mechanism B and B' to partake of certain predetermined degrees of movements corresponding to the values of the different keys that are combined with said master wheel, there is provided a differential plate E Fig. 4 co-operating with one bank of keys, as the bank Y, and another similar plate E' co-operating with the bank Z; such plates being substantially the same in construction and operation, a description of one only need be given. The differential plate is arranged at the rear of the machine immediately against the back plate D, to which it is steadied by guides 40 passing through slots 41, and in the present embodiment has secured to it a bent plate or arm $g$ to which is pivoted the ratch-bar $f$, Figs. 1, 4, 8 and 9. The differential plate is otherwise supported so as to move longitudinally by a pair of links 42 hung from the cross bar of the machine frame. The lower end of the plate is supported immediately above the rear ends of the keys so that in its movement it will pass above them without interference, and in so doing its edge presents a stop against the movement of a second key until it returns to its normal position. The differential plate is made to move lengthwise differentially by the action of the several keys with which it is combined through the engagement of said keys each with one of a series of slots 2 that are formed to extend from the lower edge of the plate upwardly above the rear end of each key and are differentially inclined from a vertical position, as shown in Fig. 4, and with their lower or entering ends in the normal position of the plate coinciding with the guide slots 1 of the back plate D, which guide slots thus prevent the lateral displacement of the keys in moving the differential plate.

The slot of the differential plate at the left hand of the view shown in Fig. 4, entered by the rear end of the units key when its front end is depressed, is but slightly inclined from the vertical so that as the key end moves upward it will force the plate E and the connected ratch-bar longitudinally just far enough to produce the requisite movement of the master wheel $a$, and consequently of the adding train governed thereby, to register the unit. On the other hand the slot 2 at the right hand end of the plate, which is entered by the inner end of the key of the highest denomination, is so far inclined from the vertical as that the movement of the key therein will produce a maximum movement of the differential plate, said movement being made to bear the same proportion to the length of movement produced by the units key as the denomination of said highest key bears to the unit, so that if the unit be 5 and the highest key be 95, the movement of the differential plate produced by the highest key will be nineteen times as great as that produced by said units key. The return of the differential plate to its normal position after being moved by a key is effected or assisted by means of a spring 43; the spring bringing the plate back so that its arm $g$ strikes a suitable stop 47 on the top plate V.

As seen in Fig. 4 the slots in the differential plate terminate in vertical portions at both their upper and lower ends. The purpose of the vertical portions at the lower ends of the slots is to enable the end of an operated key to fully enter its co-operating slot in the plate before it begins to move the latter, and also to positively bring the plate to rest before it is disengaged from it at the end of its return stroke. The purpose of the vertical portions at the upper ends of the slots is to cause the plate to be given its full movement and allowed to come to rest before the key quite completes its stroke, so that any tendency of the plate to move too far, under its own momentum, is thereby overcome and when it has been given its proper movement it becomes securely locked until the key begins its return stroke. So, too, the provision for such idle movement of the keys at the ends of their positive strokes enables them to perform other work necessary to be done after the differential plate and parts moving with it have been given their full movement. Thus, in a machine in which the plate actuates a type-carrier, to set the latter to print the values of the respective keys, the excess of movement of the key, after the carrier has been set, may be utilized to actuate the printing devices which co-operate with the types; or where the plate actuates a register, as in the machine illustrated in this case, such excess of movement of the keys may be employed to operate a clutch or other connecting device between the plate and register, as hereinafter explained. This part of my invention is not restricted in its broader scope to a differential plate whose inclined slots terminate in vertical portions, or other straight portions in line with the movement of the keys, for I believe myself to be the first in the art to employ such a plate having differentially inclined slots without such terminations; and, too, such terminations may be formed at one end of the slots and not at the other; but, for the reasons above set forth, it is highly advantageous to provide the plate with the differential slots terminating at both ends in the vertical or other straight portions, as shown.

I am aware that it is old in the art to combine a plurality of keys of different values with a movable plate having a plurality of differentially inclined cam surfaces terminating at one end with portions in line with the strokes of the keys, but in the instances with which I am familiar such cam surfaces were not formed by slots of substantially equal width throughout their length, as in my machine, and the plate was liable to be thrown ahead of the key when the latter was quickly or violently operated and thereby produce an inaccurate indication or registration. It will be seen that in my machine there is no opportunity for independent movement of the plate after the operated key enters its slot in the plate; as soon as an operated key engages the plate it becomes so connected to it that thereafter the plate can have no movement independent of the key; so that after the key has begun to move the plate the latter is absolutely controlled by the key and the plate cannot be thrown ahead of the key or carried too far by its own momentum.

I am not aware of any instance in the prior art where a plurality of keys were combined with a differentially movable plate or frame by means of any sort which would so connect an operated key to the plate as to prevent independent movement of the plate after it had been started by the key. Again, in the prior machines with which I am familiar the differential cam surfaces terminated at one end in portions in line with the strokes of the keys, but not at the other, and I am not aware of any instance in which a plurality of keys of different values have been arranged to actuate a differentially movable plate or frame by means of differential cam-engaging surfaces terminating at both ends in portions in line with the strokes of the keys, whether such cam surfaces be located upon the plate or upon the keys.

The effective operation of the differential plate E or of its ratch-bar in causing the movement of the registering mechanism is in this instance had upon the return movement of said plate or of its ratch-bar, preferably under the force of the spring 43, whereby the register is not influenced by any irregular movement of the keys, but is moved simply in consequence of the key movement but by a separate and substantially non-varying instrumentality. The ratch-bar therefore is arranged to move idly past the ratchet e, in one direction and as soon as it reaches the limit of movement in that direction, such limit being determined by the distance the plate E is moved, is automatically placed in engagement with the ratchet to move it a corresponding distance upon its return stroke. For this purpose the ratch-bar is flexibly connected to the arm g of the plate E, in this instance pivoted to it, as seen in Fig. 8. A spring 13 bearing against the bar may be employed to disengage the bar from the ratchet and hold them disengaged during the stroke of the bar and plate in one direction, but this is not necessary, owing to the shape of the teeth upon the ratch-bar and ratchet. When the parts are in their normal position of rest the ratch-bar is positively held in engagement with the ratchet, and the latter and the master-wheel thereby locked from movement, by a rotary cam 46 acting upon the ratch-bar through the medium of a bent finger or elbow lever 45 pivoted to the frame and carrying an anti-friction roller which bears against the ratch-bar. The shape of the cam 46 is shown in Figs. 9 and 10 and the direction of its rotation indicated by the arrows. It is shown in normal position in Fig. 9, holding the ratch-bar in engagement with the ratchet, from which it will be seen that its first forward movement will bring its cut-away portion opposite the finger 45 and thereby release the ratch-bar and permit the spring 13 to throw it rearward and disengage it from the ratchet, as indicated in Fig. 10. The cam 46 is given a full revolution at each operation of any one of the keys, through the medium of a mechanical movement hereinafter described. It turns the first half of its revolution during the positive stroke of the operated key and movement of the plate E and ratch-bar to the right, and the second half during the return stroke of the key and return movement of the plate and bar. It results from this that after the plate and bar have been given their full movement to the right by the operation of a key the shoulder of the cam opposite that engaged with the finger 45 in Fig. 9 will engage said finger and throw it forward and re-engage the ratch-bar with the ratchet. During the return movement of the parts the enlarged portion of the cam will travel over the finger 45 and maintain the ratch-bar in engagement with the ratchet, and will hold them engaged when the parts come to rest, as seen in Fig. 8, thereby positively locking the ratchet and master-wheel at the end of the return movement of the parts and effectually preventing any overthrow of them.

No detailed description is deemed necessary of the specific form of the train of adding wheels of this registering mechanism, as they may be varied within wide limits, the well known Geneva movement being shown. It may be stated, however, that each of the adding wheels b of the train, excepting the first one, which is permanently in gear with the master wheel a, is mounted upon a swinging arm d. The wheels are held in proper co-operative relation against the pressure of springs i bearing against the arms d and tending to separate them, by a cam h engaging the left hand arm d. When this cam is disengaged from said arm the springs i will throw the arms to the left against stops k, thereby separating the wheels and permitting each wheel to be turned independently to indicate zero. In lieu of these springs each arm may be connected by a rod with the cam so as to separate the adding wheels when the cam is moved for that purpose.

The indicating mechanism of the machine may be of the usual or any suitable character for this class of machines, but that which I have employed embodies novel features of construction and operation which may now be described. The indicators consist of numbered tablets c carried upon the upper ends of vertical rods 28, one for each key, and are adapted to be exposed to view at the usual window in the upper part of the casing of the machine. The rods 28 are mounted and vertically guided in two bearings, one a fixed plate of the framework through which the stems of the tablets c loosely pass, above their junction with the rods 28, as seen in Fig. 2, and the other a transverse plate of a swinging frame 29 hung upon a rod 31 in rear of the rods. Each of the rods 28 is provided with a longitudinal slot in which is pivoted a detent plate 30 which is engaged by a spring which presses its upper end forward against a stop and projects its lower end out of the slot and to the rear of the rod. Extending transversely across the row of rods, in rear of the same and in position to co-operate with the spring-detents 30, is a fixed bar 33. With the parts in the position shown in Fig. 2 it will be seen that if one of the rods 28 be lifted its detent 30 will yield as it passes the bar 33 and then spring rearward above it, so that when the rod is released and begins to fall the detent will catch upon the bar and support the rod in elevated position. If the lower end of the frame 29 be then swung forward the detent will be carried off the bar and the rod will be released and drop back to normal position. This much of the indicating mechanism is similar to that shown and described in my prior patent, No. 428,679, of May 27, 1890, and the novelty of this part of my present invention consists in the means for moving the swinging frame 29 to release the exposed indicators. In my prior patent this frame was moved by the spring-actuated lid of the money drawer, which lid was arranged to be released by connections with a locking bar extending across the front ends of the keys and operated independently of them. In my present machine the swinging frame is moved by connections with the keys themselves in such manner that upon the operation of any key the frame will first be swung forward, to release the exposed indicator, and then released and allowed to spring back to normal position to catch under the detent of the newly lifted rod. The frame is swung forward by means of a cam 75 fast upon a rotary shaft extending horizontally across the machine beneath the rear ends of the keys, the cam being arranged to engage a friction roller carried by a forwardly extending and depending arm 14 of the frame 29. The shaft 71 is given a complete forward revolution at each operation of the machine by means of a mechanical movement actuated by the keys and hereinafter described, during which the cam will swing the lower end of the frame 29 forward, as seen in Fig. 3, and then release it and permit it to swing by gravity back to normal position.

It is obvious that other means than the rotary shaft and cam, actuated by the keys, may be employed for moving the frame 29 to release the elevated rod, and this feature of my invention, in its broader scope, contemplates the new mode of operation by which the elevated rods are automatically released upon the operation of succeeding keys, and is not restricted to any particular character of connection between the keys and swinging frame for moving the latter. Even where a rotary shaft and cam are employed any other suitable mechanical movement for rotating the shaft by the operations of the keys may be substituted for the one hereinafter described. So, too, it is not essential that the tablet rods be provided with yielding detents, since the adjustment of the parts may be made such that the detents of the rising rods will not touch the supporting bar 33, but I prefer to employ the spring detents shown.

I am not aware of any instance in the prior art where a series of tablet rods adapted to co-operate with a fixed supporting bar have been connected with the operating keys by any means which would cause an elevated rod to be released upon the operation of a succeeding key, and my invention in this respect is limited only by the terms of my respective claims in which it is expressed.

With the keys of each bank, or as might obviously be the case with all of the keys in the machine, there is provided a key controller F, F', Figs. 2, 6, 11, to 16, each consisting essentially in the present construction of a bar or frame common to the keys of the bank, and movable with them, to which the keys become attached or coupled when displaced from normal position, and means for compelling a full movement of said bar or frame and consequently of the operated keys; the controller F' for the dollars bank also including the single key X.

Inasmuch as the key-controlling devices for the two banks of keys are substantially the same in construction and mode of operation, I will describe in detail only one of them, that for the cents bank of keys, with such reference to the other as may be necessary. Loosely hung upon the fulcrum rod 100 of the key levers are two rearwardly-extending rods 32, one at either side of the bank of cents keys; Figs. 2, 6, 11, 14 and 16. The rear ends of these two frames are rigidly connected by a cross-rod 35, and their upturned forward ends, above the rod 100, are likewise rigidly connected by a similar rod 35, the two arms 32 and the rods 35 constituting a rigid frame hung upon the rod 100, and the rod 35 connecting the front ends of the arms forming a guard above the key levers to hold them to their seats on the rod 100. The arm 32 adjacent to the side frame of the machine is longer than the opposite arm 32 and projects rearwardly of the frame. Loosely hung between upward extensions or ears upon the arms 32 is a swinging bar 34 provided at its lower end with a rearwardly projecting flange 4 adapted to co-operate with hooks or recessed lugs 3 upon the key levers A. Secured to the bar 34 at one end is a forwardly curved pendent arm 16 carrying at its end a friction roller adapted to co-operate with a cam 17. When the parts are in their normal position of rest the engagement of the roller with the lower portion of the cam 17 holds the lower edge of the bar 34 swung forward and its flange 4 immediately in front of the hooks 3 upon the key levers. Whenever the front end of one of the levers is depressed and its rear end engages the rod 35 and lifts the swinging frame high enough to carry the roller of the arm 16 out of the recess in the cam 17 the bar 34 will swing rearward and its flange 4 will catch under the hook 3 of the operated key, thereby attaching such key to the swinging frame, the engagement of the bar 34 with the hook 3 and the upper edge of the key with the rod 35 serving to securely lock the key to the frame, as seen in Fig. 16. (A stop pin 19 upon the side arm 32 limits the rearward movements of the arm 16.) As the key continues its movement the roller upon the arm 16 will travel up the curved rear edge of the cam 17 which is so shaped as to hold the bar 34 in positive engagement with the hook of the operated key. Upon the return movement of the key and swinging frame the engagement of the roller upon the arm 16 with the lower portion of the cam 17, as the roller comes opposite the recess in the latter, will throw the lower edge of the bar 34 forward again and disengage its flange from the hook of the key. From the foregoing description it will be seen that each operated key becomes coupled to the swinging frame as soon as it is displaced from normal position and is obliged to move with the frame until it is returned to such position.

By combining with the swinging frame some suitable means for compelling a definite movement of it in each direction when once displaced from normal position a like definite movement of each operated key may be insured, and the novel means I employ for this purpose may now be described: The rearwardly projecting end of the lengthened arm 32 above referred to is provided with a slot which embraces a friction collar upon a stud 18 projecting laterally from the side of a vertically reciprocating rack frame 84 mounted in vertical guide-ways 89, Figs. 4, 6, 11, 17 and 18, this connection of the rack frame with the arm 35 causing the frame to be given a definite reciprocating movement at each operation of a key. Mounted to rotate upon a fixed stud 70 between the two racks of the rack-frame is a toothed segment 15 adapted to alternately engage the opposite racks, and provided with a spring-tooth 6. With the parts in the position shown in Fig. 17, if any one of the key levers be given a full positive stroke the rack-frame will be lifted to the position shown in Fig. 18 and the left hand rack will turn the teeth of the segment 15 in the direction of the arrow to the position shown in Fig. 18. In reaching such position the spring tooth 6 will have engaged the lowermost tooth in the right hand rack and slipped past it as seen in Fig. 20, so that upon the return stroke of the operated key and downward movement of the racks the right hand rack will turn the segment 15 onward in the direction of the arrow another half revolution, at the end of which the spring-tooth 6 will become re-engaged with the opposite rack, as seen in Fig. 17. This particular arrangement of devices for converting reciprocating into rotary motion forms the subject-matter of a separate patent, No. 458,303, granted to me August 25, 1891, and forms the subject-matter of claims therein as a new mechanical movement, so that only a brief description of it is deemed necessary here. The segment 15 has fast upon one side of it, Fig. 20, a ratchet 36, engaged by a pawl which prevents reverse movement of it, and consequently prevents any retrograde movement of the rack frame and parts moving with it when they have been started in one direction or the other. Inasmuch as each operated key is coupled to the swinging frame, and the swinging frame is connected to and moves with the rack-frame, it will be seen that when any key is started it will be compelled to make a complete stroke in each direction. In order to permit a slight initial movement of the key before it comes under the influence of its controlling device the ratchet 36 is provided with a mutilated or plain portion 5, Fig. 20$^a$, which normally lies under the pawl when the parts are at rest, so that a key and the connected parts will have a very slight movement before the pawl engages the teeth of the ratchet to compel a complete movement of the parts. The ratchet is also preferably provided at a point diametrically opposite the portion 5 with a second plain portion 5$^a$, of less length than the portion 5, in order that when the operated key is at the limit of its down stroke it and the connected parts may be allowed slight movement before the pawl again engages the teeth of the ratchet to compel a complete return movement of the parts.

As above stated the particular mechanical movement which I have employed for converting the reciprocating movements of the keys into rotary movement in the ratchet forms the subject-matter of a separate patent, and any other suitable mechanical movement may be substituted for it in my present machine.

So far as I am aware I am the first in the art to employ a rotary ratchet and co-operating pawl as a controlling device for the keys or other parts of a machine of this character, so that the novelty of my invention in this respect does not depend upon the mechanical movement employed for converting reciprocating into rotary motion.

The rotary motion derived from the reciprocation of the keys is utilized not only in the controlling device above described, but for imparting rotary motion to other parts of the machine for various purposes. Thus, by means of a gear 73 fast to the segment 15, and a train of intermediate gears 72, 74, rotary movement is imparted to the shaft 71 heretofore described, which, it will be remembered, has fast upon it the cam 75 which co-operates with the swinging frame of the indicating mechanism, Figs. 2 and 3. The gear 73 also meshes with a gear 37 which is fast upon and imparts rotary movement to the cam 46 heretofore described, Figs. 8, 9 and 10.

So far as I am aware I am the first to employ the combination of a rotary shaft and a mechanical movement for giving it a complete revolution at each operation of one of the keys in a machine of this character, and desire to secure the same as my invention for all the purposes to which it is applicable.

In the present machine the controlling devices above described are duplicated for the dollars bank of keys, Figs. 4 and 6. The shaft 71, instead of extending the entire width of the machine, is in two parts, the abutting ends of which are confined in the bearing 60, Fig. 24, so that the two portions of the shaft will be operated independently, the one portion by the movement of any key in the cents bank Y, and the other portion by the movement of any key in the dollars bank Z or by the single key X.

In lieu of the two independent controllers F, F', only one might be employed as indicated in Fig. 6ª. In this construction the controller F is common to all of the keys in the machine so that a key in each of the banks and the single key X may be moved at one time and thus, by reason of their hooks 3, become coupled to the bar 34 so as to move in unison through their entire stroke. In this case of course only one rack-frame 84 need be used and one cam 17 for rocking the hook 4 of the bar 34 into engagement with the hooks of the keys.

The cash register illustrated also embraces a cash drawer or receptacle G Figs. 2, 4 and 11 to 16. This drawer is located in a compartment 104 in the lower portion of the machine and is adapted to be positively moved outward or to its open position for access to its contents. It is provided with a pair of side flanges 105 adapted to rest on one or more supporting rolls 106 mounted on studs projecting into the compartment from the side frames, and under a roll 107 mounted above the flanges 105 near the rear of the compartment, thus forming a way for the easy movement of the drawer in and out of its compartment, and also steadied sidewise by steadying rolls 108 with vertical axes, also attached to the side frame of the machine. When in its closed position, the drawer may be moved more or less to its open position by the direct action of a cam or incline 109 connected in this construction to and forming part of the rack-frame 84, so as to be movable vertically therewith, the rack-frame itself, it will be remembered, being carried by the rearwardly extended side arm 32 of the swinging key-coupler and key-controller frame, Figs. 17 and 18. This cam or incline acts against a stud or anti-friction roll 110 projecting from the side of the cash drawer in position to be struck by the cam 109 upon the vertical movement of the latter, Figs. 2, 4, 11 to 16, and upon the continued movement of the cam to positively move the drawer outward from its compartment; the upper roll 107 counteracting the upward thrust of the cam upon the drawer.

The rack-frame at the opposite side of the machine also carries a cam or incline 109 Fig. 4, bearing against another stud 110 projecting from the drawer. Hence the drawer may be moved open when any key in either of the banks is operated by the force exerted upon the key. In case a single key-coupling and controlling frame were employed for all the keys, as in Fig. 6ª, said frame might carry a cam plate 109 at each end, so that upon the operation of any key in either set both cams would act upon the drawer to force it open. The cam 109 returns to its normal idle position simultaneously with the complete movement of the key controller and return of the key, so that when the drawer is returned into its compartment it will meet with no obstruction; the cam 109 being entirely out of the way as seen in Fig. 2. It of course will be understood that so far as this drawer opening cam 109 is concerned it might be connected with any other movable part of the machine instead of to the end of the rack-frame 84. The drawer when in its closed position is locked in such position by a latch 111 that projects from a shaft 112, arranged widthwise of the machine, with the end of the latch in position to fall in front of the rear wall 113 of the drawer and thus prevent it being opened Figs. 2, 4, 11 and 12. This latch is operated to release the drawer by a cam 78, on the shaft 71, moving in contact with an arm 79 projecting from and fast to the shaft 112. This arm is duplicated upon opposite ends of the shaft 112 so that a similar cam 78 upon the other portion of the shaft 71 may when it is rotated likewise rock said shaft and raise the latch; the latch being thus common to both portions of the shaft 71. The adjustment of the parts is such that when the keys are operated the cams 78 will disengage the latch 111 from the drawer just before the cam plates 109, in their upward movement, engage the rollers 110 upon the drawer, Fig. 11, so that when said plates engage the rollers the drawer will be free to be forced open by them.

To prevent the drawer from being wholly removed from its compartment 104, it is provided with a stop 23 projecting downward through an opening in the bottom of the drawer from a lever 22 pivoted at 20 to the side of the drawer Fig. 2. In the normal position of the stop it is in position to strike the front wall of the framework and hence prevent the entire withdrawal of the drawer from its compartment. The upper end of the lever 22 is provided with a finger piece 21 which, when the drawer is open is accessible to the attendant, and may be moved to raise the stop 23 from engagement with the front wall of the framework and thus permit the entire withdrawal of the drawer.

I am aware that it has heretofore been proposed in machines of this character to force the money drawer open, or start it, by power applied to and transmitted from the key, but in such instances with which I am familiar the drawer was not locked in its closed position by a latch connected with and controlled by the operating keys, as in my machine, but was yieldingly held closed by a friction device whose pressure had to be overcome before the drawer could be opened, thus requiring the application of additional power to the key. So, too, the drawer could be pulled open by hand, without operating a key and indicating and registering anything, or sounding the alarm, so that there was no safeguard upon the opening of the drawer, as is always desirable in machines of this class.

I am also aware that it is common in machines of this class to employ a latch controlled by the keys, for locking the drawer in its closed position, and a spring or the force of gravity to automatically open the drawer when released by the operation of a key, but in such case the drawer has to be closed against the resistance of the spring or the force of gravity by which it is opened. In my machine the drawer, when closed, is securely locked by the latch, and can only be opened by operating some one of the keys and making an indication and registration, or sounding the alarm hereinafter described; and after it has been opened there is no resistance whatever offered to its closing except its own inertia and the necessary friction upon its supports and guides, which latter is reduced to the minimum by the arrangement of supporting and guiding rollers heretofore described. So far as I am aware I am the first in the art to combine in a cash register, a series of operating keys, a money-drawer, a latch therefor so connected with the keys in any manner as to release the drawer upon the operation of a key, and means of any sort actuated by the keys to force the drawer open, or start it, after it has been released by the latch, and I desire to secure such combination as my invention as broadly as the terms of my claims relating to it imply. There is also provided means by which as soon as either one of the keys has begun its movement, all the remainder are securely locked and any independent movement thereof prevented until the key being moved has returned to its normal position; and while the lower edge of the differential plate E acts as a stop to prevent the movement of a second key before the return of the first, a more efficient device will be found desirable. This key locking device consists of a series of balls or sliding bolts 7 Figs. 2, 4 and 6 arranged just above the key ends within a tubular passage in the lower end of the fixed back plate D the guide slots 1 in the latter extending through said tubular passage, as shown and the length of each bolt being equal substantially to the distance between the longitudinal axes of two contiguous keys—a bolt being provided between each pair of keys. Each key, with the exception of the two outer ones, is thus made to play between two of said sliding bolts 7, and the two outer keys between the fixed abutment 8 of the back plate D and a sliding bolt. These sliding bolts are so proportioned and disposed that they will completely fill the space between the two abutments at the opposite ends of their tubular passage, less the width of one key, so that when one key is moved the bolts will be crowded together against the opposite abutments upon opposite sides of the moved key, and thus form a complete barrier above the remaining keys, preventing their movement. To hold the sliding bolts thus crowded together during the full movement of the moved key, each of the keys are deep enough, or have extensions or keepers 9, corresponding to the position of the bolts in an arc of a circle drawn from the axis of the keys, so that during the full movement of a key some portion of the key or its extension 9 is always in position to take the thrust of the bolts should there be an attempt to move a second key before the first one is returned to its normal position.

In the example of key coupler shown in Fig. 6ª, it may be desirable to prevent the movement of a key in one bank during the movement of a key in the other bank, so that while the machine is adapted to couple a key in different banks to the coupler and permit those two or more keys to move simultaneously, it is necessary to provide for the locking of the keys in one bank during the movement of a key in the other bank, should only one key be desired to be moved.

With the keys and the locking device, shown in Fig. 6, there is provided for each bank of keys, see Figs. 25 and 26, a supplemental finger 105 that is adapted to enter between either a pair of contiguous sliding bolts 7 or between the abutment 8 and the sliding bolt. One of these fingers is in the present instance arranged at the end of each of the banks of keys shown, and is in the form of a lever pivoted upon the rod 100 and extending rearward, with its end adapted to enter a slot in the fixed back plate D, and having a tendency, under the force of a weight or spring 106, to move up into the slot and thus crowd the sliding bolts together and prevent any key being moved in that bank. The end of the finger is normally held out of its guide slot by the downward pressure of the key coupler 34. When only one key is to be moved, and a key for instance in the bank Y is moved, its end will have so far entered between a contiguous pair of sliding bolts at the time the key coupler is moved that the finger 105 of that bank will be locked against movement as well as the remaining keys of the bank by reason of the sliding bolts as before described; but as soon as the coupler is raised from pressing upon the fingers 105, the finger of the bank X in which no key has been moved will be free to move upward under the pressure of its spring between the abutment 8 and the sliding bolt and thereby crowd the bolts coacting with that bank of keys together so that all those keys will be locked against movement. Upon the return of the key and the key coupler 34 it will meet the raised finger of the bank of keys X and press it back to its normal position ready for another operation. When a key in each bank is moved, the fingers 105 will be inactive and the remaining keys of the banks will be locked against movement by the crowding together of the sliding bolts coacting with each bank as before. This key locking device is also made the means for locking all of the keys against movement so long as the cash drawer or receptacle remains open; this part of the invention including a cover movable to expose the cash drawer as well as a drawer movable with respect to its cover or compartment, or some other movable part of the machine which in the exigencies in the use of this class of machine it is found desirable should be returned to its normal condition after an effective operation. For this purpose there is provided an automatic keeper H (see particularly Figs. 6, 7, 14 to 16), of bell crank form mounted to rock in bearings in a bracket 77, sustained by one of the cross bars of the framework of the machine. One arm 61, of the bell crank, extends in position to bear against the rear wall 113 of the drawer, while the other arm 62 is in position to enter one of the guide slots 1, in the fixed back plate D, and pass between a sliding bolt 7 and an abutment 8, as in Fig. 7. So long as the drawer is wholly within its compartment or in its closed position, as in Fig. 14, its rear wall, against which the arm 61 of the keeper rests, will hold its other arm against the pressure of a spring 10 from between the sliding bolt and the abutment; but as soon as the drawer is moved out, as in Fig. 15, thus taking away the support of its rear wall from the arm 61, the spring 10 will tend to rock the bell crank rearwardly so that its arm 62 enters the guide slot and crowds the sliding bolts together.

To adapt the same keeper to a machine embracing two independently operated banks of keys, as the present one, the keeper is of duplex form so that the sliding bolts co-operating with each bank will be simultaneously moved to lock both banks of keys. Upon the return of the drawer to its closed position its rear wall will strike the arm or arms 61 of the keeper, lift it and rock its other arm or arms out of engagement with the sliding bolt or bolts and thus free the bolts so that any key may be operated.

The automatic keeper may be rendered inactive by providing a catch 63, see Figs. 14, 15 and 16, that may be thrown into operation to engage a projection 64 of the keeper and hold it against the pressure of the spring 10 from operating upon the outward movement of the drawer, or when its arm 61 is not supported. The catch 63 is hung from the key shaft 100 and is thrown into or out of operation by a lever 65, extending upward through an opening in the top plate B of the machine frame, which to throw the catch into action is depressed so that a shoulder 11 on the lever 65 will strike the under side of the top plate and be held in such engagement by a spring 12. To release the catch the lever will be rocked slightly to free its shoulder from the top plate and then move upwardly slightly to raise the catch 63, as shown in Fig. 16.

I am aware that it is common in machines of this class to provide a key-locking device arranged to co-operate with the money drawer in such manner as to lock the keys when the drawer is opened and prevent operation of them until it is closed; but I am not aware of any instance in which such key locking device has embodied as one of its constituent elements a series of stops, sliding bolts, or other means for preventing simultaneous operation of two or more keys in a given set or bank. So far as I am aware I am the first in the art to combine a series of keys, locking means of any sort permitting the operation of single keys but preventing the simultaneous operation of two or more, a money-drawer, and means of any sort co-operating with the money drawer and with said key-locking means to lock all of the keys from operation when the drawer is opened; and it is obvious that in this combination, and in carrying out this mode of operation, any usual or suitable form of such key-locking devices, and any suitable connection of them with the drawer, may be employed.

The machine may be also provided with an alarm mechanism I, Figs. 22 to 24, sounded upon the operation of the keys in the different banks. This mechanism consists of the usual bell 50, sounded by a hammer 51, having an end 52 in the path of movement of a cam 53 on the revoluble shaft 71. Each portion of the shaft carries a similar cam 53 arranged adjacent the bearing 60, and the end 52 of the bell hammer crank is widened sufficiently to be acted upon by either or both of the cams 53, so that whichever portion of the shaft is being rotated its cam will rock the bell crank against a spring plunger 54 to sound the bell. The alarm mechanism may be rendered inactive or prevented from sounding by moving an abutment arm 55 beneath a portion of the bell hammer, preventing its weighted end from touching the bell, as shown in Fig. 23 and in dotted lines Fig. 24. This abutment arm is carried at the lower end of a vertical rod 56 extending upward through an opening in the top plate V and provided with a thumb wheel by which the shaft may be rotated to place the abutment arm into or out of active position.

The machine is also provided with a lock under the control of the proprietor by which the entire mechanism may be locked at any time and prevented from being operated surreptitiously. This lock consists of a bar 102 extending the length of the machine, see Figs. 4 and 6, beneath the top plate V, Figs. 2, 14 and 16, having at either end depending rods 103 normally to one side of the arms 32 of the controllers F and F', but in position when the bar 102 is moved lengthwise to lie directly above said arms and form a stop against their movement should a key in either bank be struck. When the bar 102 is in its moved or locking position it may be secured by a padlock not shown.

An understanding of the operation of the improved registering machine will have been gained from the foregoing description of its construction and arrangement, but a brief description of the various movements imparted to the mechanism upon the operation of a key may now be given. The normal or idle position of the parts is shown in Figs. 1, 2 and 4, the cash drawer being closed and locked and the machine ready to indicate and register a sale upon the operation of any key. Upon the movement of a key, say the 25 cents key, its first operation will be to pass between a pair of sliding bolts 7, crowding them in opposite directions against the opposite abutments 8, thus locking the remaining keys against movement, and simultaneously therewith to commence to move the key controller F by the direct contact of the key with the under side of its rear rod 35, thereby moving the entire frame composed of the arms 32 and cross bars 35. This through the arm 32 imparts a vertical reciprocation to the rack-frame 84 and thence to the ratchet 36, moving its plain portions 5 under its pawl, and while doing so is gradually rocking the hook 4 of the bar 34 into engagement with the hook 3 of the key by the movement of its extension 16 from out of the recess in the cam 17. The end of the key is also moved against the end of the tablet rod bearing the 25 cents indicator and commences to lift said rod. Upon the reciprocation of the rack-frame rotation has also been imparted to the shaft 71 carrying the tablet frame rocking cam 75, the drawer latch cam 78 and the bell hammer cam 53, and to the shaft carrying the ratch-bar engaging cam 46. As soon as this has occurred the ratchet wheel 36 has been been moved far enough so that its pawl has engaged with its teeth and thus the key is now entirely within the control of the key controller and must make a complete stroke in both directions. Upon a slight further movement of the key, which has now entered its respective slot in the differential plate E and has moved through its straight portion and is in contact with the inclined or effective portion of the slot ready to move the plate, and the shaft 71 continuing to revolve, cam 78 has moved against the arm 79 of the shaft 112 and has rocked said shaft and its latch 111 from the position shown in Fig. 2 and dotted lines Fig. 12, into the position shown in full lines in said last named figure; thus having unlocked the drawer. The rack-frame continuing to move vertically has also been moving the drawer moving cam 109 connected thereto into contact with the drawer stud 110, and as shown in Fig. 11 is acting to move the drawer positively outward by the pressure exerted upon the key during the further upward movement of the rack-frame. While this is occurring the cam 75 of the shaft 71 is acting against the extension 14 of the rocking tablet frame 29, as shown in Fig. 3, so that the tablet and rod that has been previously exposed, with its detent 30 caught by the fixed bar 33, is rocked away from said bar so that it will fall to its unexposed position by gravity; and during the further movement of the key to the end of its stroke in one direction, the cam 75 has passed the extension 14, allowing the tablet frame to move by gravity to its normal position so that the tablet which has been elevated by the movement of the key will be in position to have its detent rest upon the fixed bar 33. During this movement of the key its end has been acting against the inclined slot of the differential plate and has consequently moved the ratch-bar $f$ idly past the ratchet $e$ of the registering mechanism, and simultaneously with the key reaching the limit of its downward stroke the ratch-bar operating cam 46 has moved the movable finger 45 against the rear of the ratch bar, placing the latter in engagement with the ratchet. Also at this time the rack-frame 84 has rotated the mutilated gear 15 to the position shown in Fig. 18 so that its movable tooth 6 has been moved into engagement with the teeth upon the opposite side of the frame.

It should be stated that just before reaching the limit of its movement in this direction, the cam 53, as shown in Fig. 22, has moved in contact with the arm of the bell hammer and trips the same, sounding the alarm just as the key reaches the limit of such movement. The key is now ready to return to its normal position, which it does by the weight of the parts it has operated, or partly by the weight of the key controller, represented by the bar 34, and the power of the spring 43 which it has stored up in moving the differential plate E. Upon this movement of the key, the parts are allowed to return to their normal positions, the ratch-bar rotating the ratchet $e$, and hence the master wheel $a$, of the registering mechanism a distance equivalent to five units of movement so as to add twenty-five to the sum previously registered by that registering mechanism; and at the completion of the return movement of the key and the rack-frame, the cam 46 will have been rotated so as to relieve the pressure from the movable finger 45, freeing the ratchbar from the ratchet $e$, and also have returned the drawer opening cam 109, back to its normal position, and also the drawer latch 111, so that in the closing movement of the drawer such movement will not be impeded by having to return said cam to its initial position, but will simply raise the latch by the contact of its rear wall therewith, which after passing will be caught as in Fig. 2, and locked by the falling of the latch in front of said rear wall.

In the opening movement of the drawer under the outward pressure exerted by the cam 109, the arm 61 of the keeper H, Figs. 14, 16, not being supported by the drawer wall 113 will fall into the position shown in Fig. 16 so that one of its opposite ends 62, as shown in Fig. 7, will be bearing against one of the sliding bolts 7 of the key lock, ready to crowd the bolts to one side and enter between this bolt and the abutment 8 as soon as the key returns to its normal position and from between the sliding bolts freeing the latter and allowing the keeper to move to the position shown in Fig. 15, thus again crowding the sliding bolts together but above all of the keys and preventing their movement until the drawer has been moved to its closed position so that the keeper is moved to its inactive position as shown in Fig. 14. A precisely similar movement is imparted to the devices upon the operation of any of the keys in the bank Z, except that instead of operating the key controller, rack-frame, differential plate and registering plate of the cents bank Y, it will operate the duplicate of these devices belonging to said bank Z. And in the operation of the single key X, a similar operation of the devices will ensue, except that instead of moving the differential plate E' and register B' of the dollars bank Z, it will operate its independent register B².

What is claimed is—

1. The combination of a plurality of keys of different values and a differentially movable plate or frame actuated thereby, the differential movements of the plate being effected by a series of differential cam engaging surfaces between the keys and plate, each of said surfaces beginning and ending in portions in line with the strokes of the keys, substantially as described.

2. The combination of a plurality of keys of different values and a differentially movable plate or frame actuated thereby, said plate or frame being provided with a plurality of differential cam surfaces adapted to be engaged by the different keys and each beginning and ending in a portion in line with the stroke of the key, substantially as described.

3. The combination of a plurality of keys and a differentially movable plate or frame by means which connects the operated keys to the plate as soon as they engage it and prevents independent movement of the plate throughout the strokes of the keys, substantially as described.

4. The combination of a plurality of keys and a movable plate provided with a plurality of differentially inclined slots, each of said slots being of substantially the same width throughout its length and adapted to fit its co-operating key and prevent independent movement of the plate, substantially as described.

5. The combination of a plurality of keys and a movable plate provided with a plurality of differentially inclined slots, each of said slots being of substantially the same width throughout its length and adapted to fit its co-operating key, and each terminating at one end in a portion in line with the movement of the key, substantially as described.

6. The combination of a plurality of keys and a movable plate provided with a plurality of differentially inclined slots, each of said slots being of substantially the same width throughout its length and adapted to fit its co-operating key, and each terminating at both ends in portions in line with the movement of the key, substantially as described.

7. The combination of a plurality of operating key levers, and a longitudinally movable plate arranged transversely above the rear ends of said levers and provided with a plurality of differentially inclined slots, each slot being of substantially equal width throughout its length and adapted to fit its co-operating lever, substantially as described.

8. The combination of a plurality of operating key levers, and a longitudinally movable plate arranged transversely above the rear ends of said levers and provided with a plurality of differentially inclined slots, each slot being of substantially equal width throughout its length and adapted to fit its co-operating lever, and each terminating in vertical portions at its upper and lower ends, substantially as described.

9. The combination of a plurality of keys, a registering device adapted to register the sum of the values of the keys operated, a vertically arranged plate interposed between the keys and registering device and provided with a plurality of differentially inclined slots each of which is of substantially the same width throughout its length and adapted to fit its co-operating key, and means for compelling full strokes of the operated keys and thereby full proper movements of the slotted plate and registering device, substantially as described.

10. The combination of a plurality of keys, a registering device actuated by the keys and adapted to register the sum of the values of the keys operated, a differentially movable plate or frame interposed between the keys and registering device and engaged by the different keys throughout approximately equal portions of their strokes, means for compelling complete strokes of the operated keys, and a key stop permitting the operation of only one key at a time, substantially as described.

11. The combination of a plurality of keys arranged in independent banks, a key-controller common to said keys, for compelling complete strokes of the same, registering devices, actuated by the keys and two independent interposed differential plates, substantially as described.

12. The combination of a plurality of keys arranged in independent banks, a key-controller common to said keys, for compelling complete strokes of the same, a key stop permitting the movement of only one key in a bank at a time, registering devices, actuated by the keys and two independent interposed differential plates, substantially as described.

13. The combination of a plurality of keys, a fixed plate, a movable plate pivoted to a pair of links and guided upon the fixed plate, and provided with a plurality of differentially inclined slots adapted to co-operate with the different keys, substantially as described.

14. The combination of a plurality of keys, a plate having differentially inclined slots moved in one direction thereby, a spring for returning the plate to normal position, a ratch-bar moved by the plate, and a master-wheel of a registering device co-operating with the ratch-bar, substantially as described.

15. The combination of a key, a master-wheel a pawl moved by the key, and a cam moved by the keys and co-operating with the pawl for locking the master-wheel against movement while the key is at rest, substantially as described.

16. The combination of a plurality of keys, a differentially movable plate or frame actuated thereby, a master-wheel, a rack or ratch-bar actuated by the differentially movable plate and movable into and out of engagement with the master-wheel, and a cam actuated by the keys and co-operating with the rack to maintain it in engagement with the master-wheel during the movement of the plate in one direction, substantially as described.

17. The combination of a plurality of keys, a differentially movable plate or frame actuated thereby, a rack or ratch-bar pivoted to and moving with said plate, a master-wheel adapted to be engaged by the rack, a spring tending to hold the rack out of engagement with said wheel, and a cam actuated by the keys and co-operating with the rack to maintain the latter in engagement with the wheel during the movement of the plate in one direction, substantially as described.

18. The combination of a plurality of keys, a differentially movable plate or frame actuated thereby, a master-wheel, a rack or ratch-bar carried by the plate and movable into and out of engagement with the master-wheel, a rotary cam for maintaining it in engagement with said wheel during the movement of the plate in one direction, and means intermediate the cam and keys for rotating the former upon the operation of the latter, substantially as described.

19. The combination of a plurality of keys, a differential plate moved thereby, a registering device, connections between the plate and said device, a movable finger for insuring the positive movement of the registering device, a rotary cam, and connections between the keys and cam for converting the oscillations of the keys into a rotation of the cam, substantially as described.

20. The combination of a plurality of keys, a differential plate having a ratch-bar movable longitudinally, a master-wheel, and a movable finger for contact with the ratch-bar and against which the ratch-bar moves longitudinally, substantially as described.

21. The combination of a plurality of keys, a plurality of indicator rods actuated thereby, a fixed bar or support for the moved rod, and connections with the keys for disengaging the rod from the fixed support upon the succeeding operation of a key, substantially as described.

22. The combination of a plurality of keys, a plurality of indicator rods actuated thereby and mounted in a movable frame, a fixed bar or support for the moved rod, and connections between the keys and movable frame for moving the latter to disengage the elevated rod from the fixed support at the succeeding operation of a key, substantially as described.

23. The combination of a plurality of keys, a plurality of indicator rods actuated thereby, a fixed bar or support for the moved rod, a rotary cam for disengaging such rod from the fixed support at the succeeding operation of a key, and connections between the keys and cam for rotating the latter, substantially as described.

24. The combination of a plurality of keys, a plurality of indicators actuated thereby and mounted in a movable frame, a fixed bar or support for the moved rod, a rotary cam co-operating with the frame to disengage the moved rod from the fixed support at the succeeding operation of a key, and connections between the keys and cam for rotating the latter, substantially as described.

25. The combination of a plurality of indicating rods provided with detents, a fixed bar or support co-operating with the detents, a plurality of keys for actuating the rods, and connections with the keys for disengaging the detent of an elevated rod from the fixed support, to release the rod, upon the succeeding operation of a key, substantially as described.

26. The combination of a plurality of indicator rods provided with detents, a fixed bar or support co-operating with the detents, a plurality of keys for actuating the rods, and connections with the keys for moving an elevated rod laterally, to disengage its detent from the fixed support and release the rod, upon the succeeding operation of a key, substantially as described.

27. The combination of a plurality of indicator rods provided with yielding or spring detents, a fixed bar or support co-operating with the detents, a plurality of keys for actuating the rods, and connections with the keys for automatically disengaging the detent of an elevated rod from the bar or support upon the succeeding operation of a key, substantially as described.

28. The combination of a plurality of indicator rods provided with pivoted detent plates, a fixed bar or support co-operating with the detent plates, a plurality of keys for actuating the rods, and connections with the keys for automatically disengaging the detent plate of an elevated rod from the fixed support upon the succeeding operation of a key, substantially as described.

29. The combination of a plurality of indicator rods provided with detents and mounted in a movable frame, a fixed bar or support co-operating with the detents, a plurality of keys for actuating the rods, and connections between the keys and movable frame for moving the latter to disengage the detent of an elevated rod from the fixed support at the succeeding operation of a key, substantially as described.

30. The combination of a plurality of indicator rods provided with yielding detents and mounted in a movable frame, a fixed bar or support co-operating with the detents, a plurality of keys for actuating the rods, and connections between the keys and movable frame for moving the latter to disengage the detent of an elevated rod from the fixed support at the succeeding operation of a key, substantially as described.

31. The combination of a plurality of indicator rods provided with detents, a fixed bar or support co-operating with the detents, a plurality of keys for actuating the rods, a rotary cam for moving the rods laterally to disengage the detents of the elevated rods from the fixed support, and connections between the keys and cam for rotating the latter, substantially as described.

32. The combination of a plurality of indicator rods provided with yielding detents and mounted in a movable frame, a plurality of keys for actuating the rods, a rotary cam co-operating with the movable frame to disengage the detents of the elevated rods from the fixed support, and connections between the keys and cam for rotating the latter, substantially as described.

33. The combination of an indicator carried by a rod movable both vertically and laterally, and an operating key or lever and connections for positively moving said rod laterally, by power applied to said key substantially as described.

34. The combination of an indicator carried by a rod passed loosely through a fixed guide plate near its upper end and capable of swinging backward and forward at its lower end, and an operating key or lever for positively swinging the lower end of the rod out of vertical line, by power applied to said key substantially as described.

35. The combination of an indicator carried by a rod provided with a detent and passed loosely through a fixed guide plate near its upper end so as to swing backward and forward at its lower end, a fixed bar or support for the rod, and an operating key or lever for positively moving the lower end of the rod out of vertical line, by power applied to the key substantially as described.

36. The combination, in a cash register, of a plurality of keys, a movable bar or frame common to and uniformly moved by the different keys, a rotary member, as a shaft, and a mechanical movement between said rotary member and the movable bar or frame for converting the reciprocating movements of the latter into rotary movement in the former, and operating to give said rotary member one complete revolution at each operation of any one of the keys, substantially as described.

37. The combination, in a cash register, of a plurality of keys, a movable bar or frame common to and uniformly moved by the different keys, a rotary ratchet and co-operating pawl, and a mechanical movement between said ratchet and movable frame for converting the reciprocating movements of the latter into rotary movement in the former, whereby a full movement of said frame at each operation is insured, substantially as described.

38. The combination, in a cash register, of a plurality of keys, a movable bar or frame common to the keys and to which the different keys become attached when displaced from normal position, a rotary ratchet and co-operating pawl, and a mechanical movement between the movable frame and ratchet for converting the reciprocating movements of the former into rotary movement in the latter, whereby a full stroke of each operated key is insured, substantially as described.

39. The combination of a key, a key-controller including a rotary ratchet and co-acting pawl, and connections with the key for turning the ratchet, substantially as described.

40. The combination of a plurality of keys, a key-controller common thereto and including a rotary ratchet and co-acting pawl, and a mechanical movement between the keys and ratchet for converting the oscillation of the former into rotation of the latter, substantially as described.

41. The combination of a key, a key-controller including a rotary ratchet having a non-toothed portion and a co-acting pawl, and connections with the key for turning the ratchet, substantially as described.

42. The combination of a key, a key-controller including a rotary ratchet having two diametrically-opposite non-toothed portions and a co-acting pawl, and connections between the key and ratchet for turning the latter, substantially as described.

43. The combination, in a cash register, of a plurality of keys, a money-drawer, a latch for holding the same closed, connections between the keys and latch for releasing the drawer upon the operation of a key, and means actuated by the keys for positively forcing the drawer open after it is released, whereby upon operating a key the latch is first disengaged from the drawer and the latter then forced open by the power applied to the key, substantially as described.

44. The combination, in a cash register, of a plurality of keys, a money-drawer, a latch for holding the same closed, connections between the keys and latch for releasing the drawer upon the operation of a key, a movable bar or frame common to the keys, and a cam carried by said frame and co-operating with the drawer, to force it open when released, substantially as described.

45. The combination, in a cash register, of a plurality of keys, a money-drawer, a latch for holding the same closed, connections between the keys and latch for releasing the drawer upon the operation of a key, a movable bar or frame common to the keys, and a plate having a vertically inclined edge carried by said frame and co-operating with a roller upon the drawer to force the latter open when released, substantially as described.

46. The combination, in a cash register, of a plurality of keys, a money drawer, a latch for holding the same closed, a movable bar or frame common to the keys, connections between said frame and latch for releasing the drawer upon the operation of a key, and a cam actuated by said frame to force the drawer open when released, substantially as described.

47. The combination, in a cash register, of a plurality of keys, a money-drawer, a latch for holding it closed, a cam co-operating with the latch to release the drawer, a second cam co-operating with the drawer to force it open when released, a movable bar or frame common to the keys, and connections between said frame and the cams for actuating the latter to release the drawer and force it open, substantially as described.

48. In a cash register, the combination of the drawer-compartment having the supporting rollers 106 and the rollers 107 mounted upon its opposite walls, the reciprocating money-drawer G having the flanges 105 secured to its opposite sides, said flanges resting upon the rollers 106 and passing beneath the rollers 107, the operating keys and the vertically reciprocating cam plates 109 actuated thereby and co-operating with the drawer to force it open, substantially as described.

49. In a cash register, the combination of the drawer compartment having the supporting rollers 106 and guide rollers 107 and 108 mounted upon its opposite walls, the reciprocating money-drawer G having the flanges 105 secured to its opposite side, said flanges resting upon the rollers 106 and passing beneath the rollers 107, the operating keys, and the vertically-reciprocating cam plates 109 actuated thereby and co-operating with the rollers 110 upon the drawer to force it open, substantially as described.

50. The combination, in a cash register, of a plurality of keys, a money-drawer, a latch therefor, a rotary cam co-operating with the latch to release the drawer, and a connection between the keys and cam for completely rotating the latter, substantially as described.

51. The combination, in a cash register, of a plurality of keys, a money-drawer, a latch therefor, a rotary cam co-operating with the latch to release the drawer, a movable bar or frame common to all of the keys, and a connection between said frame and the cam for completely rotating the latter upon the operation of a key, substantially as described.

52. The combination, in a cash register, of a plurality of keys arranged in two separate sets, a money-drawer, a single latch therefor, two independently rotating cams, one for each set of keys, co-operating with said single latch, to release the drawer upon the operation of a key in either set, and connections between the cams and respective sets of keys for rotating the cams, substantially as described.

53. The combination, in a cash register, of a plurality of keys, a money-drawer, a latch therefor, a rotary cam co-operating with the latch to release the drawer, a connection between the keys and cam for rotating the latter, and means actuated by the keys for forcing the drawer open when released, substantially as described.

54. The combination, in a cash register, of a plurality of keys, a money-drawer, a latch therefor, a rotary cam co-operating with the latch to release the drawer, a reciprocating cam for forcing it open when released, a movable bar or frame common to the keys, and connections between said frame and the two cams for rotating one and reciprocating the other, to release the drawer and force it open, substantially as described.

55. The combination of an indicator carried by a rod movable both vertically and laterally, a money drawer, a latch for holding the same closed, an operating key or lever, and connections between said lever and the indicator-rod and drawer-latch for moving the former laterally and releasing the drawer by the same operation of the lever.

56. The combination of an indicator carried by a rod passed loosely through a fixed guide plate near its upper end and capable of swinging backward and forward at its lower end, a money-drawer, a latch for holding the same closed, an operating key or lever, and connections between said lever and the indicator-rod and drawer latch for swinging the rod out of vertical line and releasing the drawer by the same operation of the lever.

57. A drawer-compartment containing a suspended drawer, in combination with a vertically reciprocating cam for moving the drawer open and an upper roll taking the thrust of the cam upon the drawer, substantially as described.

58. The combination, in a cash-register, of a plurality of keys, locking devices permitting the operation of single keys but preventing the simultaneous operation of two or more, a money-drawer, and means co-operating with the drawer and locking devices to cause the latter to lock all of the keys when the drawer is opened, substantially as described.

59. The combination, in a cash register, of a plurality of keys, a plurality of movable stops co-operating with said keys to prevent the operation of more than one at the same time, a money drawer, and an arm or plate movable across the path of the stops when the drawer is opened and movable out of the path thereof by the drawer when the latter is closed, substantially as and for the purpose described.

60. The combination, in a cash register, of a plurality of keys, a plurality of laterally displaceable stops confined in a slotted guideway, for preventing operation of more than one key at a time, a money drawer, a locking arm or lever movable into position to lock the stops from displacement when the drawer is opened, and movable out of such locking position by the drawer when the latter is closed, substantially as and for the purpose described.

61. The combination, in a cash register, of a plurality of keys, a plurality of laterally displaceable stops confined in a slotted guideway, for preventing operation of more than one key at a time, a locking lever, a spring connected thereto for moving it into position to lock the stops from displacement, and a money drawer co-operating with the lever to maintain it out of locking position while the drawer is closed, substantially as and for the purpose described.

62. The combination, in a cash register, of a plurality of keys, a locking device permitting the operation of single keys but preventing the operation of two or more at the same time, a money-drawer, and a bell-crank lever interposed between said drawer and the locking devices, one arm co-operating with the former and the other with the latter, substantially as and for the purpose described.

63. The combination, in a cash register, of a plurality of keys arranged in two sets, independent locking devices co-operating with the keys of each set to prevent the operation of two keys in the same set at the same time but permitting the simultaneous operation of two keys in different sets, a money-drawer, and means co-operating with the drawer and with both sets of locking devices to prevent operation of any keys in either set when the drawer is opened, substantially as described.

64. The combination, in a cash register, of a plurality of keys arranged in two separate sets or banks, a set of locking devices for each bank of keys, preventing simultaneous operation of two or more keys in the bank, a locking arm or lever for each bank of keys co-operating with its set of locking devices to lock all of the keys of the bank from operation, springs tending to move said levers into locking position, and a movable bar or frame common to all of the keys, normally holding said levers out of locking position, but arranged to release them upon the operation of a key, substantially as described.

65. The combination, in a cash register, of a plurality of keys, a plurality of indicators actuated thereby, a support therefor, a money-drawer, a latch therefor, a rotary shaft provided with cams co-operating with the indicators and drawer-latch, and connections between the keys and shaft for rotating the latter, substantially as described.

66. The combination, in a cash register, of a plurality of keys, a plurality of indicators actuated thereby, a money-drawer, a latch therefor, an alarm mechanism, a rotary shaft, cams carried thereby and co-operating with the drawer-latch and alarm mechanism, and connections between the keys and shaft for rotating the latter, substantially as described.

67. The combination, in a cash register, of a plurality of keys, a registering mechanism actuated thereby and consisting of an initial wheel having a fixed axis and a train of wheels normally in operative connection with the initial wheel and with each other but movable out of such relation, a series of swinging arms, one for each wheel except the initial one and upon which said wheels are respectively mounted, a series of springs bearing against said arms and tending to separate the wheels, a latch or holding device for maintaining the arms and wheels in normal position against the pressure of the springs, and a series of stops for limiting the movement of the arms under the action of the springs when the arms are released from the latch or holding device, whereby upon operating said device to release the arms the wheels become automatically separated and may be independently re-set to zero, substantially as described.

68. The combination of a plurality of keys provided with hooks, a movable bar or frame common to said keys, a swinging coupling bar hung in said frame and adapted to co-operate with the hooks upon the keys to couple the operated keys to such frame, and a cam co-operating with the coupling bar to positively engage the bar with the hook of the operated key at the beginning of the stroke of the latter and to disengage it from the key at the end of its stroke, substantially as described.

69. The combination of a plurality of keys provided with hooks, a movable bar or frame common to said keys, a swinging coupling bar hung in said frame and adapted to co-operate with the hooks upon the keys to couple the operated keys to such frame, and a cam co-operating with the coupling bar to positively engage the bar with the hook of the operated key at the beginning of the stroke of the latter and maintain them in engagement throughout the stroke of the key, and to disengage them at the end of the stroke, substantially as described.

In witness whereof I have hereunto signed my name in the presence of two subscribing witnesses.

WILLIAM KOCH.

Witnesses:
N. MARLER,
GEO. H. GRAHAM.